(12) United States Patent
Shahana et al.

(10) Patent No.: US 9,334,016 B2
(45) Date of Patent: May 10, 2016

(54) BICYCLE REAR DERAILLEUR

(75) Inventors: Satoshi Shahana, Osaka (JP); Shingo Funai, Osaka (JP)

(73) Assignee: Shimano Inc., Osaka (JP)

( * ) Notice: Subject to any disclaimer, the term of this patent is extended or adjusted under 35 U.S.C. 154(b) by 582 days.

(21) Appl. No.: 13/548,546

(22) Filed: Jul. 13, 2012

(65) Prior Publication Data

US 2014/0018199 A1  Jan. 16, 2014

(51) Int. Cl.
*B62M 9/125* (2010.01)
*B62M 9/124* (2010.01)
*B62M 9/121* (2010.01)
*B62M 9/126* (2010.01)

(52) U.S. Cl.
CPC .............. *B62M 9/121* (2013.01); *B62M 9/126* (2013.01)

(58) Field of Classification Search
CPC .............................. B62M 9/125; B62M 9/124
USPC ................................................ 474/80, 81, 82
See application file for complete search history.

(56) References Cited

U.S. PATENT DOCUMENTS

| 2,108,941 | A | * | 2/1938 | Morgan | 474/80 |
| 4,934,990 | A | * | 6/1990 | Backers | 474/152 |
| 5,931,753 | A | * | 8/1999 | Ichida | 474/82 |
| 7,090,603 | B2 | | 8/2006 | Shahana et al. | |
| 2006/0189422 | A1 | * | 8/2006 | Ichida et al. | 474/80 |
| 2010/0113200 | A1 | * | 5/2010 | Yamamoto | 474/133 |

FOREIGN PATENT DOCUMENTS

| CN | 1295957 A | 5/2001 |
| TW | 519090 U | 1/2003 |

OTHER PUBLICATIONS

Shimano Inc.; Shimano SLX Rear Derailleur RD-M663 (SGS); Apr. 2012.
Shimano Inc.; DEORE XT Rear Derailleur RD-M780-S (GS/SGS), RD-M780-L (GS/SGS); Apr. 2012.
Shimano Inc., Saint Rear Derailleur RD-M810 (SS), RD-M810 (GS); May 2009.
Shimano Inc.; XTR Rear Derailleur RD-M972 (GS), RC-M972 (SGS); Jun. 2010.
Shimano Inc.; XTR Rear Derailleur RD-M980 (GS), RD-M980 (SGS); Jun. 2010.
SRAM; SRAM Type 2 Rear Derailleur, Force of Nature; Mar. 2012.

* cited by examiner

*Primary Examiner* — William E Dondero
*Assistant Examiner* — Mark K Buse
(74) *Attorney, Agent, or Firm* — Global IP Counselors (57) ABSTRACT

A bicycle rear derailleur comprises a first member, a second member and a locking structure. The second member is pivotally attached to the first member about a pivot axis. The locking structure fixes a relative position of the first and second members with respect to a rotational direction about the pivot axis. The locking structure is configured to release the relative position of the first and second members from a fixed state upon a predetermined load being provided to one of the first and second members in the rotational direction with respect to the pivot axis.

17 Claims, 9 Drawing Sheets

BICYCLE REAR DERAILLEUR

BACKGROUND

1. Field of the Invention

This invention generally relates to a bicycle rear derailleur. More specifically, the present invention relates to a bicycle rear derailleur that reduces noise that may occur while riding on rough roads, trails or the like.

2. Background Information

A bicycle rear derailleur is used to selectively move a chain from one of a plurality of sprockets to another for changing speeds of the bicycle. A typical rear derailleur has a base member, a movable member supporting a chain guide and a linkage assembly (e.g., a moving mechanism) coupled between the base member and the movable member so that the chain guide moves laterally relative to the base member. The base member is typically coupled to the rear end of the bicycle frame by a bolt that forms a B-axle for providing limited rotation with respect to the bicycle frame. The chain guide typically includes a pair of guide plates that rotatably support a guide pulley and a tension pulley between the guide plates. The chain guide is typically coupled to the movable member by a shaft that forms a P-axle for providing limited rotation of the chain guide with respect to the movable member. The linkage assembly typically includes a pair of pivotal links pivotally coupled to both the base member and the movable member. A spring typically biases the chain guide to an innermost or outermost position relative to the rear sprockets. A Bowden-type control cable with an outer sheath and an inner wire is typically coupled between the rear derailleur and a conventional shift control device. Thus, the chain guide can be moved laterally by moving the linkage assembly via the inner wire. In particular, one end of the control cable is typically connected to one of the links, and another end of the control cable is connected to a shift control device mounted on the bicycle handlebar. When the rider operates the shift control device, the operating cable is pulled or released accordingly. Pulling the inner wire moves the chain guide against the biasing force of the spring, while releasing the inner wire causes the chain guide to move due to the biasing force of the spring.

SUMMARY

Generally, the present disclosure is directed to various features of a bicycle rear derailleur. In one feature presented in this disclosure, a bicycle rear derailleur is provided in which a locking structure is provided between two members with the locking structure releasing the first and second members from a fixed state upon a predetermined load being provided to one of the first and second members.

In another feature presented in this disclosure, a bicycle rear derailleur is provided that comprises a first member, a second member and a locking structure. The second member is pivotally attached to the first member about a pivot axis. The locking structure fixes a relative position of the first and second members with respect to a rotational direction about the pivot axis. The locking structure is configured to release the relative position of the first and second members from a fixed state upon a predetermined load being provided to one of the first and second members in the rotational direction with respect to the pivot axis.

Other objects, features, aspects and advantages of the disclosed bicycle rear derailleur will become apparent to those skilled in the art from the following detailed description, which, taken in conjunction with the annexed drawings, discloses preferred embodiments of the bicycle rear derailleur.

BRIEF DESCRIPTION OF THE DRAWINGS

Referring now to the attached drawings which form a part of this original disclosure:

FIG. 1 is a partial perspective view of the portion of the rear derailleur illustrated in FIGS. 1 to 3;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
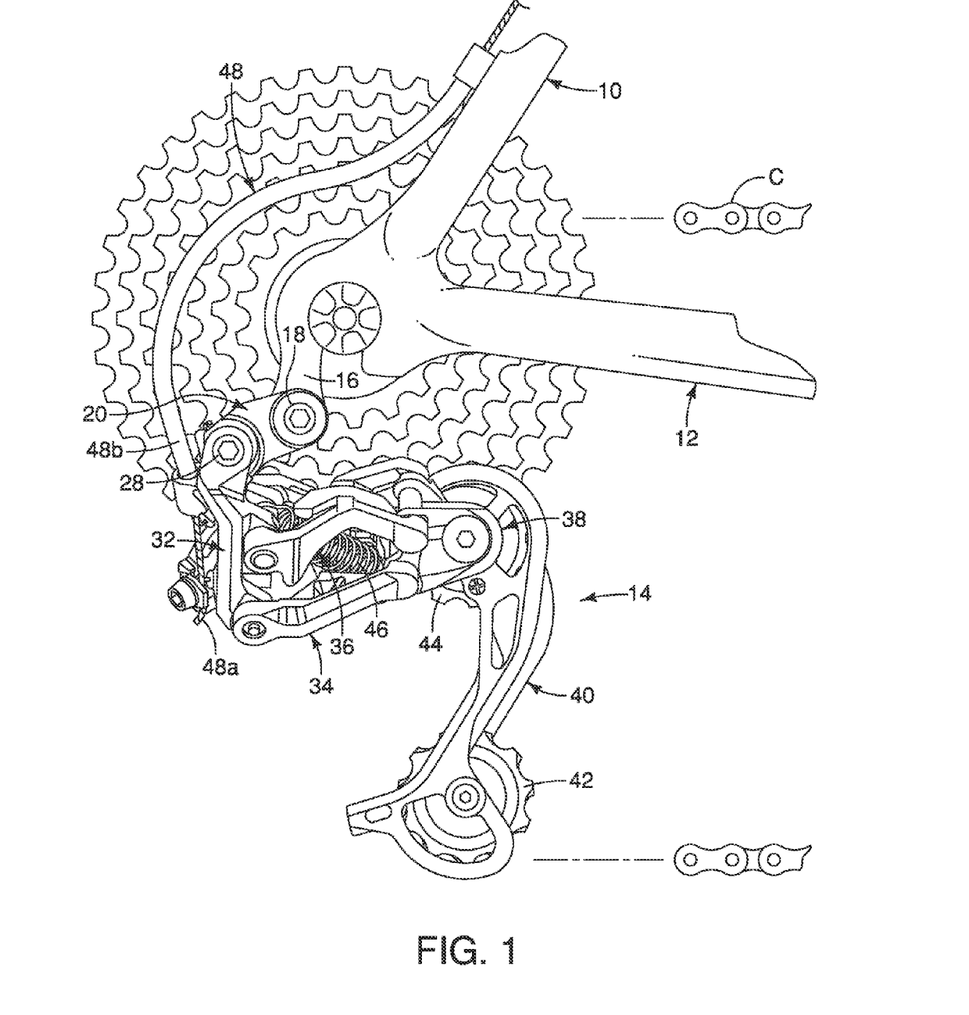
FIG. 1 is a side elevational view of a rear portion of a bicycle that includes a plurality of rear sprockets and a bicycle rear derailleur in accordance with one illustrative embodiment.

Referring initially to FIG. 1, a rear portion of a bicycle 10 is illustrated that includes, among other things, a frame 12 with a bicycle rear derailleur 14 in accordance with a first embodiment. In particular, the rear derailleur 14 is secured to a non-replaceable derailleur hanger 16 of the frame 12 by a mounting bolt 18 in a conventional manner. Typically, the derailleur hanger 16 has a threaded opening and the mounting bolt 18 is screwed into threaded opening for fixing the rear derailleur 14 to the frame 12. It will be apparent from this disclosure that a replaceable derailleur hanger could be used if needed and/or desired.

Figure 2:
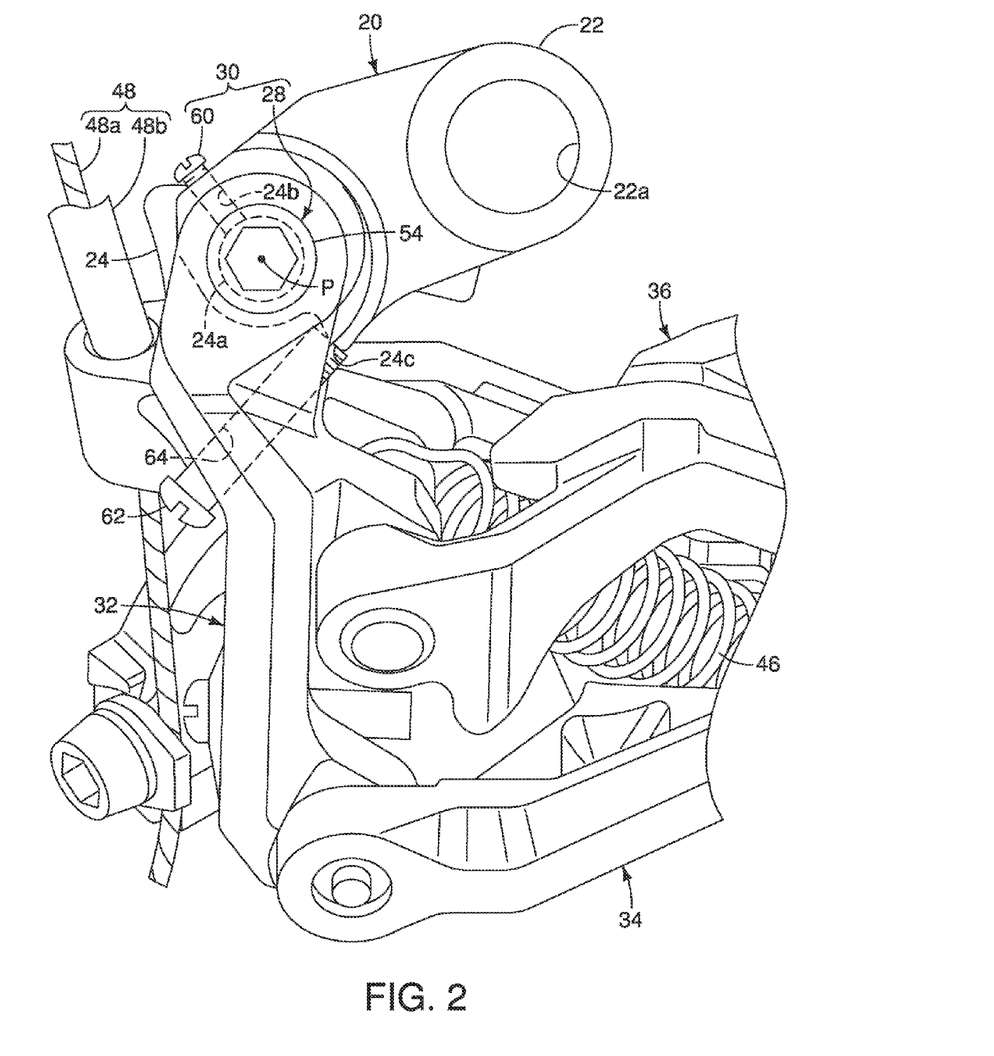
FIG. 2 is an enlarged, partial side elevational view of a portion of the rear derailleur illustrated in FIG. 1.
Figure 3:
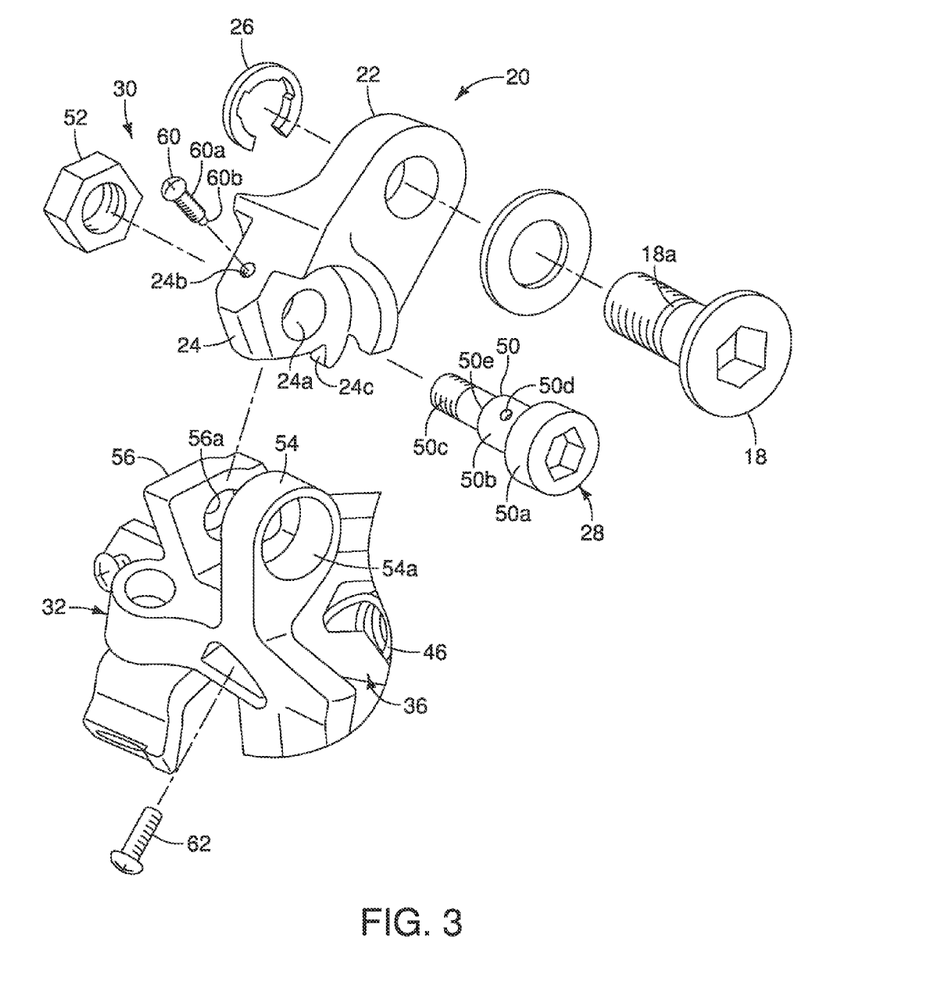
FIG. 3 is an exploded perspective view of the portion of the rear derailleur illustrated in FIGS. 1 and 2.

As seen in FIGS. 1 to 3, the rear derailleur 14 includes a mounting bracket 20 that is attached to the derailleur hanger 16 by the mounting bolt 18. Thus, the mounting bracket 20 constitutes an example of a frame attached member. The mounting bracket 20 has a first attachment end 22 and a second attachment end 24. The first attachment end 22 has a first fastener opening 22a for receiving the mounting bolt 18. Thus, to attach the rear derailleur 14 to the derailleur hanger 16, the mounting bolt 18 is inserted through the first fastener opening 22a, and is threaded into the derailleur hanger 16. The mounting bolt 18 is tightened so that the mounting bracket 20 does not pivot on the mounting bolt 18. Preferably, the mounting bolt 18 has an annular groove 18a that receives a retaining clip 26 for rotatably retaining the mounting bolt 18 in the first fastener opening 22a of the mounting bracket 20 while the rear derailleur 14 is detached from the bicycle 10. Thus the mounting bracket 20 is a frame attached member. The second attachment end 24 has a second fastener opening 24a for receiving a fastener 28. The second fastener opening 24a is a non-threaded hole with respect to the fastener 28. The fastener 28 defines a pivot axis P as explained below. The fastener 28 forms a first part of a locking structure 30, which is discussed below.

Referring back to FIG. 1, the rear derailleur 14 further includes a base member 32, a first link 34, a second link 36 and a movable member 38. The first and second links 34 and 36 form a moving mechanism or a cable operated structure that is coupled between the base member 32 and the movable member 38. The first and second links 34 and 36 movably support the movable member 38 to the base member 32. A chain guide 40 is pivotally attached to the movable member 38. The chain guide 40 rotatably supports a tension pulley 42 and an idler or guide pulley 44. A spring or biasing member 46 is interposed between the first and second links 34 and 36 to bias the movable member 38 and the chain guide 40 towards one of a top shift stage position (i.e., over the smallest rear sprocket) and a low shift stage position (i.e., over the largest rear sprocket). In the first illustrated embodiment, the spring member 46 is operatively connected between the first and second links 34 and 36 for biasing the movable member 38 and the chain guide 40 towards the top shift stage position (i.e., over the smallest rear sprocket).

In the embodiment illustrated in FIGS. 1 to 7, the mounting bracket 20 constitutes an example of a first member, and the base member 32 constitutes an example of a second member. Basically, the base member 32 (second member) is pivotally attached to the mounting bracket 20 (first member) about the pivot axis P by the fastener 28 of the locking structure 30. As will be explained below, the locking structure 30 fixes a relative position of the mounting bracket 20 (first member) and the base member 32 (second member) with respect to a rotational direction about the pivot axis P. The locking structure 30 is configured to release the relative position of the mounting bracket 20 (first member) and the base member 32 (second member) from a fixed state upon a predetermined load being provided to one of the mounting bracket 20 (first member) and the base member 32 (second member) in the rotational direction with respect to the pivot axis P.

The first and second links 34 and 36 are pivotally coupled between the base member 32 and the movable member 38 so that the movable member 38 and the chain guide 40 are movable relative to the base member 32 in a lateral direction of the bicycle 10. In other words, the cable operated structure (e.g., the links 34 and 36) movably couples the base member 32 and the movable member 38 together such that the movable member 38 is movable relative to the base member 32 between a plurality of shift stage positions. The first and second links 34 and 36 could be replaced with other types of connecting structures. Thus, the first and second links 34 and 36 constitute a link member that operatively links the base member 32 and the movable member 38 for moving the chain guide 40 laterally relative to the base member 32.

In the illustrated embodiment, a control cable 48 is provided for moving the movable member 38 relative to the base member 32. Preferably, the control cable 48 is a Bowden cable that basically includes an inner wire 48a that is slidably disposed within an outer casing 48b. The inner wire 48a is coupled to one of the first and second links 34 and 36 (e.g., the inner wire 48a is coupled to the first link 34 in the illustrated embodiment) to move the movable member 38 and the chain guide 40 laterally relative to the base member 32.

Figure 4:
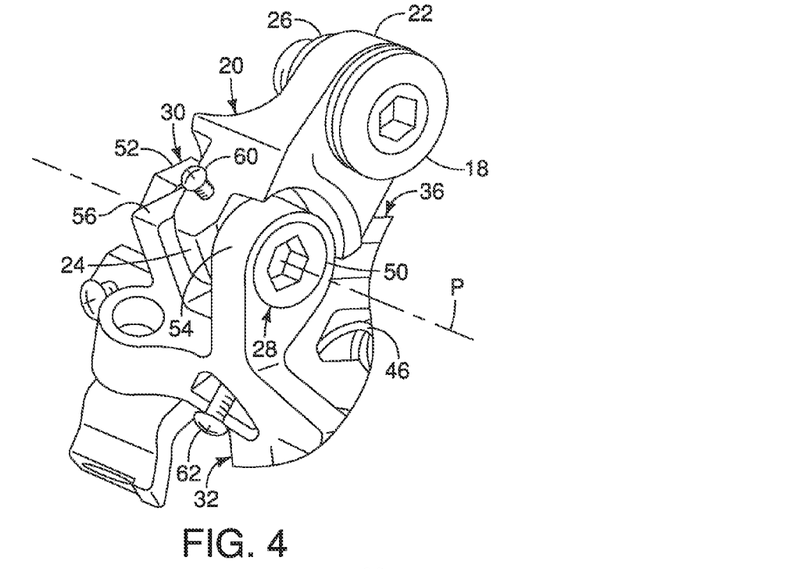

Referring to FIGS. 2 to 7, the locking structure 30 of the rear derailleur 14 will now be discussed. The rear derailleur 14 further includes a locking screw 60 (i.e., a locking member), which forms a second part of the locking structure 30. In this embodiment, the locking screw 60 screws into a threaded bore 24b of the second attachment end 24 of the mounting bracket 20 and engages the fastener 28. Thus, the fastener 28 and the locking screw 60 cooperate together to form the locking structure 30, which fixes a relative position between the base member 32 and the movable member 38 to a normal operating position such as illustrated in FIG. 4. Here, the fastener 28 includes a fastening bolt 50 and a fastening nut 52. The fastening bolt 50 has a head portion 50a, a first shaft portion 50b and a second shaft portion 50c. The first shaft portion 50b includes a recess 50d for receiving the locking screw 60 to lock the mounting bracket 20 to the fastener 28. In this way, rotational movement of the mounting bracket 20 on the fastener 28 is prevented. The first shaft portion 50b has a larger diameter than the second shaft portion 50c so that an abutment 50e is formed therebetween. Thus, when the fastening nut 52 is screwed onto the threaded end of the second shaft portion 50c and tightened, the fastener 28 cannot rotate relative to the base member 32.

Figure 5:
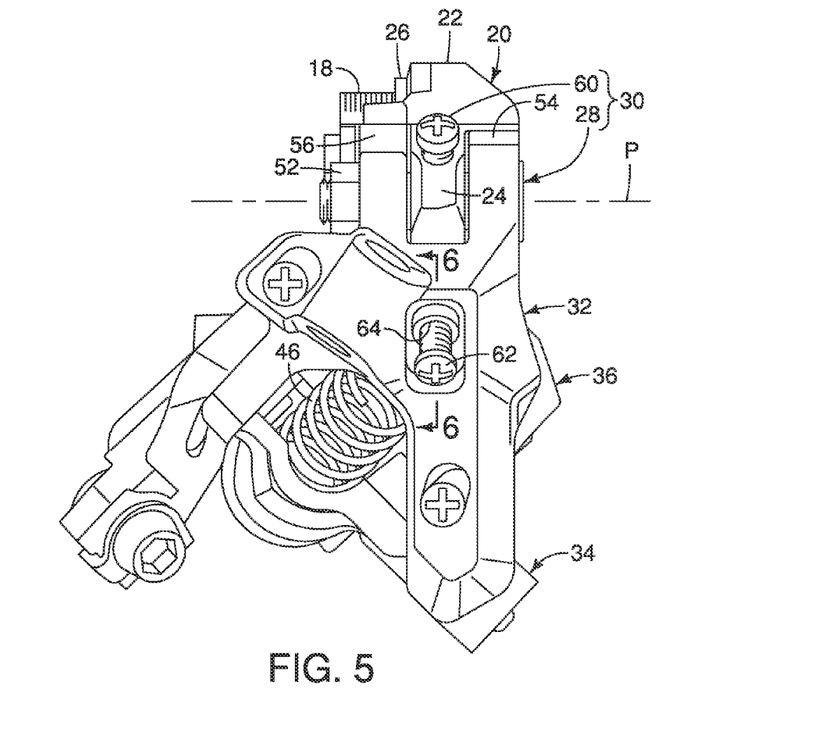
FIG. 5 is a rear end elevational view of the rear derailleur illustrated in FIGS. 1 to 4.
Figure 6:
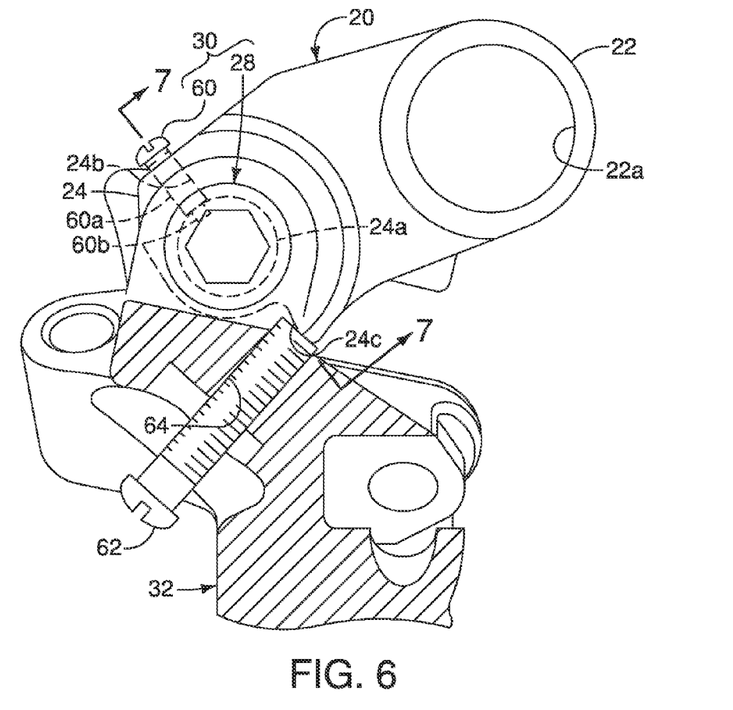
FIG. 6 is a partial cross sectional view of a portion of the rear derailleur illustrated in FIGS. 1 to 5 as seen along section line 6-6 of FIG. 5.

As seen in FIGS. 3 to 5, the base member 32 includes a pair of mounting flanges 54 and 56 for pivotally coupling the movable member 38 to the base member 32 by the fastener 28. Thus, when the locking screw 60 is not installed into the recess 50d (i.e., a non-fixed state), the fastener 28 pivotally couples the base member 32 and the movable member 38 to allow the base member 32 to pivot relative to the movable member 38 about pivot axis P. However, when the locking screw 60 is installed into the recess 50d (i.e., a fixed state) and the fastening nut 52 is screwed onto the threaded end of the second shaft portion 50c and fully tightened, the locking screw 60 and the fastener 28 fixes a relative position between the mounting bracket 20 and the base member 32 with respect to a rotational direction about the pivot axis P.

Figure 7:
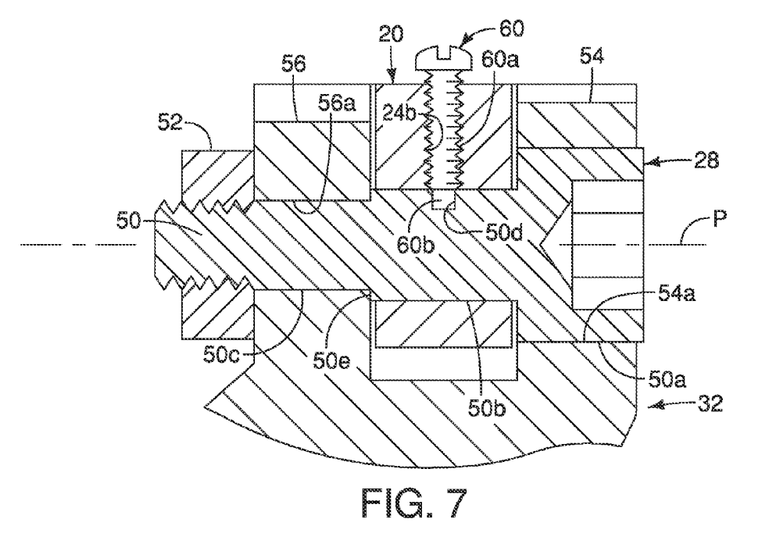
FIG. 7 is a partial cross sectional view of a portion of the rear derailleur illustrated in FIGS. 1 to 5 as seen along section line 7-7 of FIG. 6.

As seen in FIGS. 3 and 7, the mounting flange 54 has a mounting opening 54a that receives the head portion 50a of the fastener 28. The mounting flange 56 has a mounting opening 56a that receives the second shaft portion 50c of the fastener 28. The second attachment end 24 of the mounting bracket 20 is disposed in a space formed between the mounting flanges 54 and 56 of the base member 32. Preferably, the distance between the mounting flanges 54 and 56 is slightly larger than the thickness of the second attachment end 24. The second fastener opening 24a of the second attachment end 24 of the mounting bracket 20 is non-threaded with respect to the fastener 28. In this way, the mounting bracket 20 can freely pivot on the first shaft portion 50b prior locking the mounting bracket 20 to the fastener 28 using the locking screw 60.

Once the mounting bracket 20 is locked to the fastener 28 with the locking screw 60, the mounting bracket 20 can be pivoted with the fastener 28 relative to the base member 32 to a desired position. Then the fastening nut 52 can now be tightened to fix the orientation of the mounting bracket 20 relative to the base member 32. Preferably, the base member 32 includes an adjustment screw 62 that is adjustably arranged to contact an abutment 24c of the second attachment end 24 of the mounting bracket 20. In other words, the adjustment screw 62 adjusts an angle of the mounting bracket 20 relative to the base member 32. A resilient member can be disposed between the adjustment screw 62 and the abutment 24c of the second attachment end 24 of the mounting bracket 20. For example, the resilient member can be bonded to the tip of the adjustment screw 62 for contacting the abutment 24c of the second attachment end 24 of the mounting bracket 20.

In particular, the adjustment screw 62 is screwed into a threaded bore 64 of the base member 32 such that the tip of the adjustment screw 62 extends out of the base member 32 into the space between the mounting flanges 54 and 56. By turning the adjustment screw 62, the tip of the adjustment screw 62 changes a stop or rest position of the mounting bracket 20 such that the fastening nut 52 can now be tightened to fix the orientation of the mounting bracket 20 relative to the base member 32. In this way, the adjustment screw 62 is arranged to adjust the relative position between the mounting bracket 20 and the base member 32 in the rotational direction while the locking structure 30 is in a non-fixed state. The adjustment screw 62 is one example of an adjustment member that is arranged to adjust the relative position between the mounting bracket 20 and the base member 32 in the rotational direction while the locking structure 30 is in a non-fixed state. However, other types of adjustment members, such as a shimming arrangement can be utilized.

As seen in FIG. 7, the locking screw 60 includes a first section 60a and a second section 60b. Preferably, the first section 60a with a thread that screws into the bore 24b of the second attachment end 24 of the mounting bracket 20. However, the bore 24b can be non-threaded and a non-threaded locking pin could be used instead of the locking screw 60. The second section 60b is disposed in the recess 50d in the fastener 28. The recess 50d and second section 60b can be threaded or non-threaded as shown. Preferably, the second section 60b has a transverse cross section that is smaller than the transverse cross section of the first section 60a. The boundary between the first section 60a and the second section 60b defines a shear plane. The shear plane is located at the interface between the inner surface of the second fastener opening 24a and the outer surface of the first shaft portion 50b. In this way, upon a predetermined load being provided to one of the mounting bracket 20 and the base member 32 in the rotational direction with respect to the pivot axis P, the second section 60b will break (shear) from the first section 60a. Thus, by the second section 60b breaking from the first section 60a, the relative position of the first and second members is released from a fixed state to a non-fixed state upon a predetermined load being provided to one of the mounting bracket 20 and the base member 32 in the rotational direction with respect to the pivot axis P. The locking screw 60 constitutes a frangible member with a prescribed shear strength.

Figure 8:
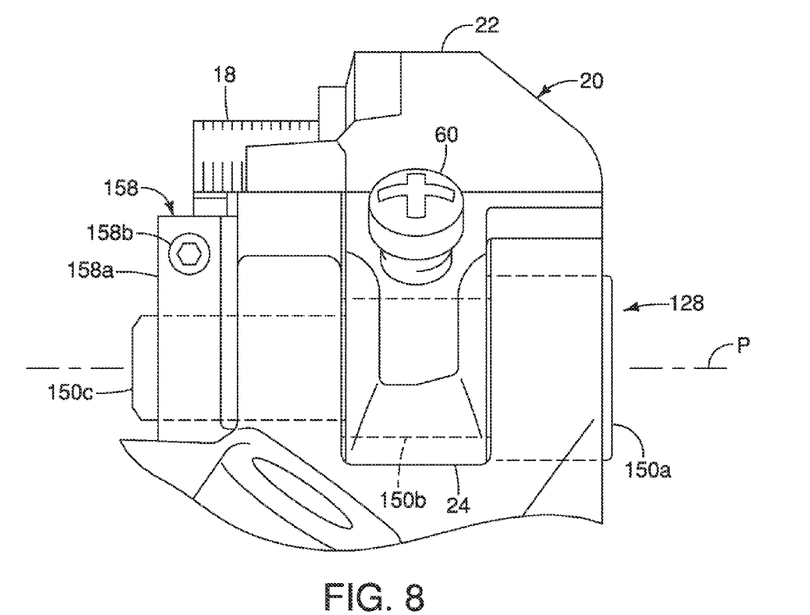
FIG. 8 is a rear end elevational view of a portion of a modified rear derailleur in accordance with another illustrative embodiment.
Figure 9:
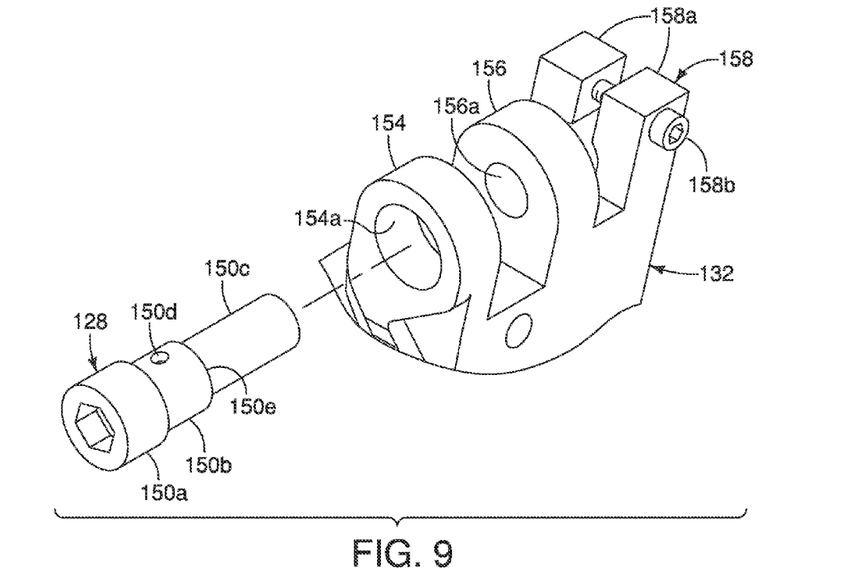
FIG. 9 is a partial perspective view of a portion of the modified rear derailleur illustrated in FIG. 8.

Referring now to FIGS. 8 and 9, the mounting bracket 20 is attached to a modified base member 132 by a modified fastener 128 in accordance with a second embodiment. The base member 132 replaces the base member 32 in the rear derailleur 14 of FIG. 1. Thus, all of the other parts of the rear derailleur 14 remain unchanged. Here, the base member 132 includes a clamp 158 having a pair of jaws 158a that are squeezed together by a clamp screw 158b. The fastener 128 is a fastening pin that is identical to the bolt 50, except that the thread has been eliminated.

The fastener 128 has a head portion 150a, a first shaft portion 150b and a second shaft portion 150c. The first shaft portion 150b includes a recess 150d for receiving the locking screw 60 to lock the mounting bracket 20 to the fastener 128 in the same way as discussed above with respect to the first embodiment. In this way, rotational movement of the mounting bracket 20 on the fastener 128 is prevented. The first shaft portion 150b has a larger diameter than the second shaft portion 150c so that an abutment 150e is formed therebetween. Thus, when the clamp 158 is tightened onto the end of the second shaft portion 150c, the fastener 128 cannot rotate relative to the base member 132. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 10:
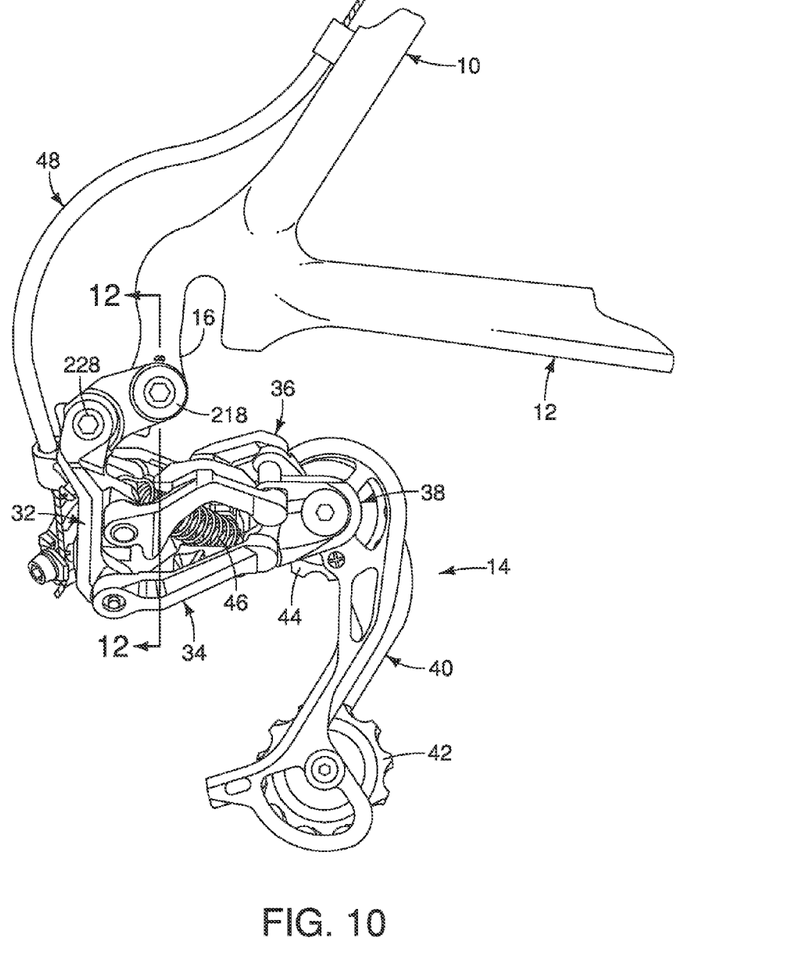
FIG. 10 is a side elevational view of the rear portion of the bicycle illustrated in FIG. 1, but with a bicycle rear derailleur in accordance with yet another illustrative embodiment.
Figure 11:
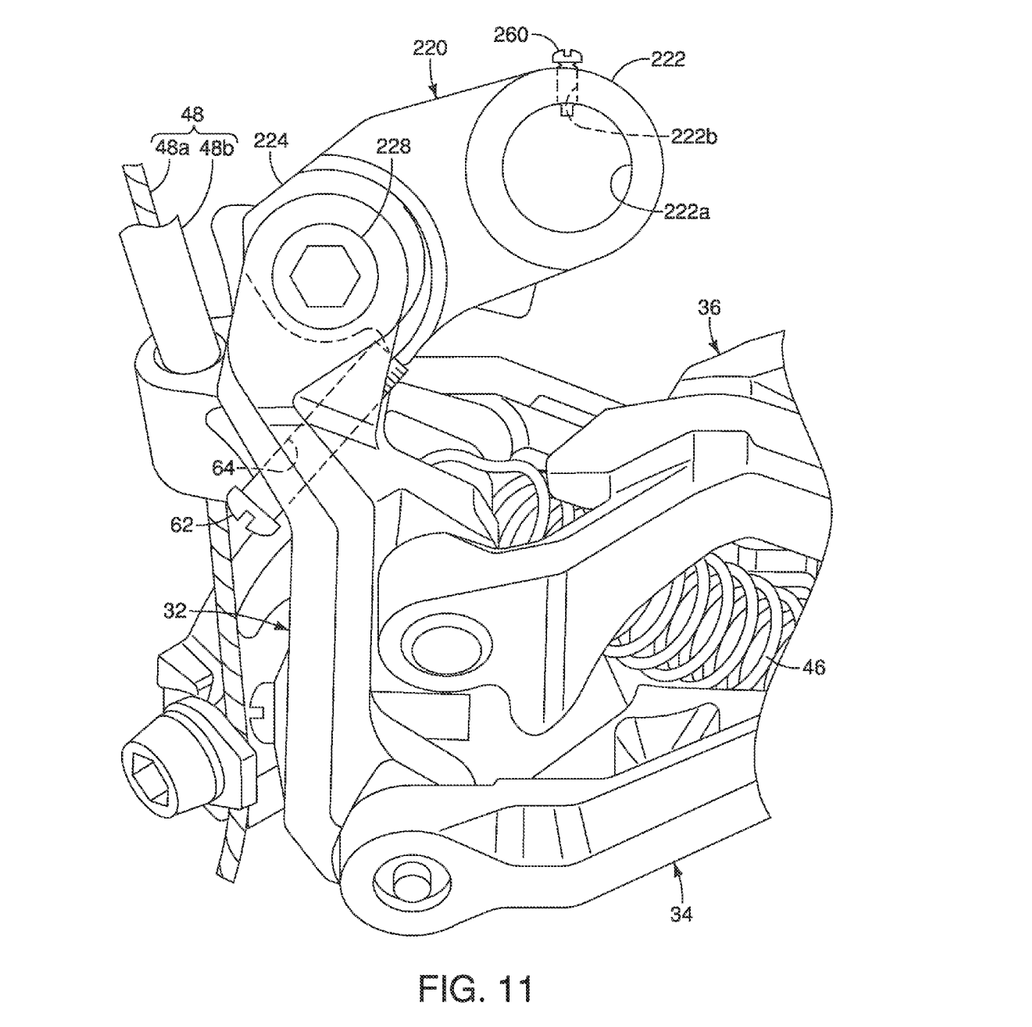
FIG. 11 is an enlarged, partial side elevational view of a portion of the rear derailleur illustrated in FIG. 10.
Figure 12:
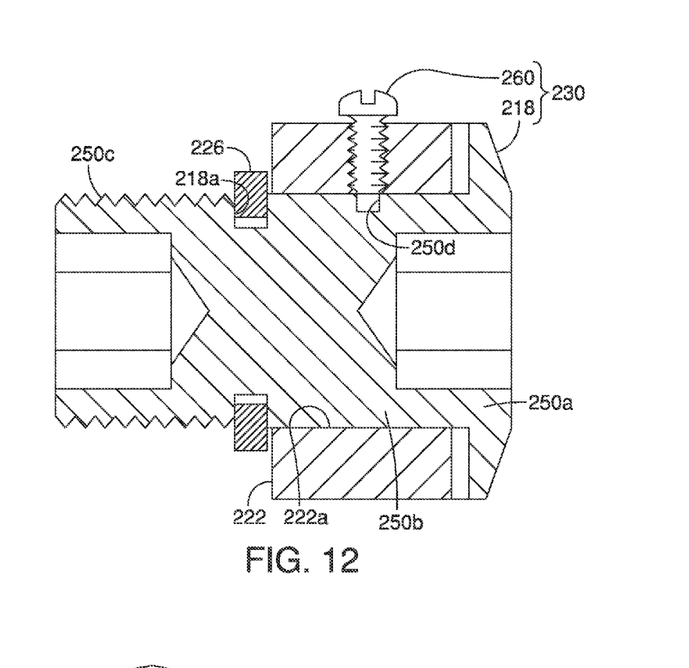
FIG. 12 is a partial cross sectional view of a portion of the rear derailleur illustrated in FIGS. 10 and 11 as seen along section line 12-12 of FIG. 10.

Referring now to FIGS. 10 to 12, a modified mounting bracket 220 will now be explained in accordance with a third embodiment. Here, the rear derailleur 14 of FIG. 1 is mounted to the derailleur hanger 16 of the bicycle frame 12 by the mounting bracket 220. The mounting bracket 220 has a first attachment end 222 and a second attachment end 224. The first attachment end 222 has a first fastener opening 222a for receiving a mounting bolt 218. Thus, to attach the rear derailleur 14 to the derailleur hanger 16, the mounting bolt 218 is inserted through the first fastener opening 222a, and is threaded into a hole of the derailleur hanger 16. The mounting bolt 218 is tightened so that the retaining clip 226 contacts the derailleur hanger 16, and so that the mounting bracket 220 can rotate on the mounting bolt 218 until a locking screw 260 is threaded into a threaded bore 222b of the first attachment end 222 and engages the mounting bolt 218. The mounting bolt 218 and the locking screw 260 form a locking structure 230 in this third embodiment. The mounting bolt 218 has a head portion 250a, a first shaft portion 250b and a second shaft portion 250c. The first shaft portion 250b includes a recess 250d for receiving a tip of the locking screw 260 to lock the mounting bracket 220 to the mounting bolt 218 in the same manner as the first embodiment. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 13:
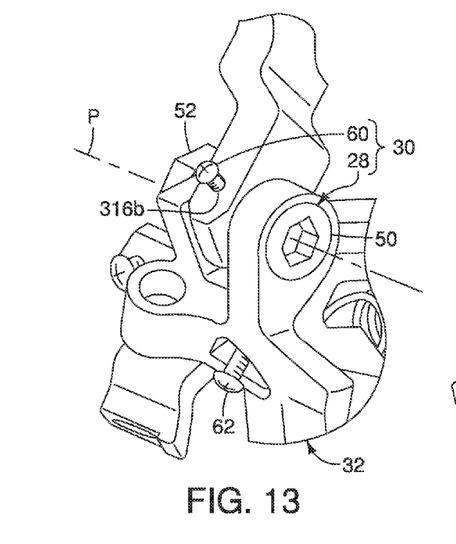
FIG. 13 is a partial perspective view of a rear portion of a modified bicycle frame with the bicycle rear derailleur of FIG. 1 being directly mounted to the modified bicycle frame.
Figure 14:
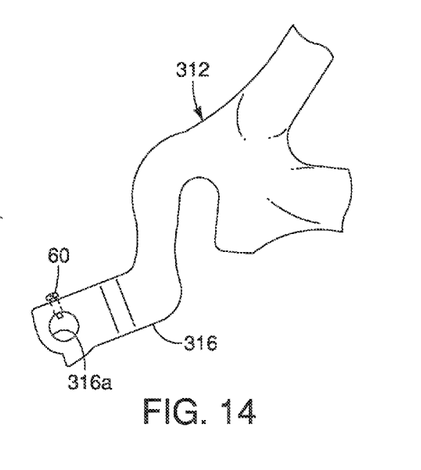
FIG. 14 is a partial side elevational view of the rear portion of the bicycle frame illustrated in FIG. 13.

Referring now to FIGS. 13 and 14, a modified bicycle frame 312 will now be explained in accordance with a fourth embodiment in which the rear derailleur 14 of FIG. 1 is directly mounted to the modified bicycle frame 312. Here, the modified bicycle frame 312 includes an attachment portion 316 having a non-threaded fastener opening 316a and a threaded bore 316b. The fastener opening 316a receives the bolt 50 of the fastener 28 of the first embodiment. The locking screw 60 of the first embodiment is screwed into the bore 316b for engaging the locking screw 60 in the same manner as the first embodiment. Thus, the locking structure 30 of the first embodiment is used to attach the base member 32 directly to the bicycle frame 312. The attachment portion 316, the locking structure 30 and the base member 32 constitutes a bicycle rear derailleur attachment structure. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. It will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially change their intended purpose. While in all of the embodiments, the adjustment screw 62 is adjustably coupled to the base member 32, the adjustment screw 62 is not limited to this arrangement. For example, in all of the embodiments that include the mounting bracket 20, the adjustment screw 62 can be adjustably coupled to the mounting bracket 20. Alternatively, the adjustment screw 62 can be adjustably coupled to the frame 312. Moreover, in the embodiments, the mounting flanges 54 and 56 of the base member 32 can be replaced with a single flange and the second attachment end 24 of the mounting bracket 20 or the frame 312 can be provided with a pair of mounting flanges that receives the single flange of a modified base member.

Also components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:
    a first member including a first attachment end and a second attachment end having an opening;
    a second member; and
    a locking structure that pivotally attaches the second member to the first member about a pivot axis such that a relative position of the first and second members is fixed with respect to a rotational direction about the pivot axis, the locking structure being configured to release the relative position of the first and second members from a fixed state upon a predetermined load being provided to one of the first and second members in the rotational direction with respect to the pivot axis,
    the locking structure including a fastener and a locking member, the fastener extending through the opening of the second attachment end of the first member, the locking member having a threaded section disposed in a bore of the first member and a non-threaded section disposed in a recess in the fastener.

2. The bicycle rear derailleur according to claim 1, further comprising
    an adjustment member arranged to adjust the relative position of the first and second members in the rotational direction while the locking structure is in a non-fixed state.

3. The bicycle rear derailleur according to claim 1, wherein the locking structure fixes the relative position of the first and second members to a normal operating position.

4. The bicycle rear derailleur according to claim 1, wherein the first member is a frame attached member; and
    the second member is a base member supporting a link member.

5. The bicycle rear derailleur according to claim 4, further comprising
    a movable member movably supported to the base member by the link member between a plurality of shift stage positions with respect to the base member.

6. The bicycle rear derailleur according to claim 5, wherein the base member includes a pair of mounting flanges, each of the mounting flanges having a mounting opening that receives a portion of the fastener, and the second attachment end of the frame attached member being disposed in a space formed between the mounting flanges of the base member.

7. The bicycle rear derailleur according to claim 5, wherein the opening of the second attachment end of the frame attached member is non-threaded with respect to the fastener.

8. The bicycle rear derailleur according to claim 5, further comprising
    a chain guide pivotally attached to the movable member.

9. The bicycle rear derailleur according to claim 5, wherein the link member includes a first link and a second link that movably support the movable member to the base member.

10. The bicycle rear derailleur according to claim 9, further comprising
    a biasing member interposed between the first and second links such that the movable member is biased towards one of a top shift stage position and a low shift stage position.

11. The bicycle rear derailleur according to claim 4, wherein
    the second attachment end of the frame attached member includes an abutment; and
    the base member includes an adjustment screw adjustably arranged to contact the abutment of the second attachment end of the frame attached member.

12. The bicycle rear derailleur according to claim 1, wherein the non-threaded section has a transverse cross section that is smaller than a transverse cross section of the threaded section.

13. The bicycle rear derailleur according to claim 1, wherein
the fastener includes a fastening bolt and a fastening nut.

14. A bicycle rear derailleur comprising:
a first member including a first attachment end and a second attachment end having an opening;
a second member; and
a locking structure that pivotally attaches the second member to the second attachment end of the first member about a pivot axis such that a relative position of the first and second members is fixed with respect to a rotational direction, the locking structure being configured to release the relative position of the first and second members from a fixed state upon a predetermined load being provided to one of the first and second members in the rotational direction with respect to the pivot axis,
the locking structure including a fastening pin and a locking member, the fastening pin extending through the opening of the second attachment end of the first member, the locking member being disposed in a bore of the first member and in a recess in the fastening pin,
the second member including a clamp that non-rotatably secures the fastening pin with respect to the second member.

15. A bicycle rear derailleur attachment structure comprising:
a bicycle frame including an attachment portion having a fastener opening;
a base member; and
a locking structure fixing a relative position of the attachment portion and the base member with respect to a rotational direction about the pivot axis, the locking structure being configured to release the relative position of the attachment portion and the base member from a fixed state upon a predetermined load being provided to one of the attachment portion and the base member in the clockwise rotational direction with respect to the pivot axis,
the locking structure including a fastener extending through the fastener opening of the attachment portion of the bicycle frame, the base member pivotally attached to the attachment portion about a pivot axis by a fastener, the locking structure further including a locking member having a threaded section disposed in a bore of the attachment portion of the bicycle frame and a non-threaded section disposed in a recess in the fastener.

16. A bicycle rear derailleur comprising:
a mounting bracket including a first attachment end and a second attachment end, the first attachment end having a first fastener opening and a bore that passes from an outside of the first attachment end to an inside of the first fastener opening;
a base member pivotally attached to the second attachment end of first member;
a mounting bolt configured to pass through the first fastening opening of the mounting bracket to pivotally attach the mounting bracket to a bicycle frame;
a locking member having a threaded section disposed in the bore of the first attachment end of the mounting bracket, the locking member having a non-threaded section engaged with the mounting bolt such that a relative position of the mounting bracket and the mounting bolt is fixed with respect to a rotational direction.

17. The bicycle rear derailleur according to claim 16, wherein
the mounting bolt includes a recess formed in a shaft portion of the mounting bolt, and
the non-threaded section of the locking member is received in the recess.

* * * * *